(12) United States Patent
Weinberger

(10) Patent No.: US 9,590,296 B2
(45) Date of Patent: Mar. 7, 2017

(54) ANTENNA STRUCTURE AND METHOD FOR ASSEMBLING AN RFID DEVICE

(71) Applicant: NXP B.V., Eindhoven (NL)

(72) Inventor: Martin Weinberger, Munich (DE)

(73) Assignee: NXP B. V., Eindhoven (NL)

( * ) Notice: Subject to any disclaimer, the term of this patent is extended or adjusted under 35 U.S.C. 154(b) by 35 days.

(21) Appl. No.: 14/724,507

(22) Filed: May 28, 2015

(65) Prior Publication Data

US 2016/0352005 A1 Dec. 1, 2016

(51) Int. Cl.
*H01Q 1/38* (2006.01)
*H01Q 5/371* (2015.01)
*H01Q 5/10* (2015.01)

(52) U.S. Cl.
CPC .................. *H01Q 1/38* (2013.01); *H01Q 5/10* (2015.01); *H01Q 5/371* (2015.01)

(58) Field of Classification Search
CPC ............. H01Q 1/38; H01Q 5/371; H01Q 5/10
USPC .................................................. 343/700 MS
See application file for complete search history.

(56) References Cited

U.S. PATENT DOCUMENTS

| | | | | |
|---|---|---|---|---|
| 6,689,994 B2* | 2/2004 | Reichelt | ................... | H05B 6/72 219/634 |
| 8,421,690 B2* | 4/2013 | Cummings | .............. | H01Q 1/02 343/704 |
| 8,436,318 B2* | 5/2013 | Sinclair | ................... | H01J 27/16 250/423 R |
| 8,674,274 B2* | 3/2014 | Parsche | ................... | H05B 6/72 219/411 |
| 2013/0075476 A1 | 3/2013 | Doran | | |

FOREIGN PATENT DOCUMENTS

| | | |
|---|---|---|
| EP | 1143378 A1 | 10/2001 |
| WO | 0175772 A2 | 10/2001 |
| WO | 2014007465 A1 | 1/2014 |

\* cited by examiner

*Primary Examiner* — Brian Young

(57) ABSTRACT

An antenna structure is disclosed. In the embodiment, the antenna structure includes a substrate and an antenna that is formed on the substrate, the antenna having a first end and a second end that are separated. The antenna structure also includes a heating element formed on the substrate with at least a portion of the heating element being located in the separation between the first and second ends of the antenna, with the heating element being electrically separate from the antenna.

19 Claims, 9 Drawing Sheets

ANTENNA STRUCTURE AND METHOD FOR ASSEMBLING AN RFID DEVICE

BACKGROUND

The assembly of radio-frequency identification (RFID) devices typically utilizes a serial assembly line process in which several RFID devices move rapidly through steps of the serial assembly process. For example, assembly can involve depositing an adhesive on an antenna structure, placing an integrated circuit (IC) device on the antenna structure, and curing the adhesive to secure the IC device to the antenna structure.

SUMMARY

In an embodiment, an antenna structure is disclosed. In the embodiment, the antenna structure includes a substrate and an antenna that is formed on the substrate, the antenna having a first end and a second end that are separated. The antenna structure also includes a heating element formed on the substrate with at least a portion of the heating element being located in the separation between the first and second ends of the antenna, with the heating element being electrically separate from the antenna.

In another embodiment, the heating element of the antenna structure runs perpendicular to edges of the first end and the second end of the antenna.

In another embodiment, the heating element of the antenna structure includes alignment pads.

In another embodiment, the heating element of the antenna structure includes at least one trigger portion and a heating portion, wherein an integrated circuit (IC) device spans the separation and wherein the trigger portion is external to a footprint of the IC device and the heating portion is, at least, partially located in the separation between the first end and the second end of the antenna.

In another embodiment, the width of the at least one trigger portion in the heating element of the antenna structure is larger than the width of the heating portion.

In another embodiment, the trigger portion in the heating element of the antenna structure includes two pads on opposite sides of the IC device.

In another embodiment, the heating portion of the antenna structure is partially located within the separation between the first end and the second end of the antenna and within the footprint of the IC device.

In another embodiment, the heating element of the antenna structure is formed from the same material as the antenna.

In another embodiment, the antenna structure further includes an IC device coupled to the first end and the second end of the antenna such that at least a portion of the heating element runs under the IC device parallel to edges of the first end and the second end.

In another embodiment, the heating element of the antenna structure is co-planar with the antenna.

In another embodiment, a method for assembling an RFID device is disclosed. In the embodiment, the method involves placing an adhesive on an antenna structure of an RFID device, the antenna structure including a substrate, an antenna formed on the substrate, the antenna having a first end and a second end that are separated, and a heating element formed on the substrate with at least a portion of the heating element being located in the separation between the first and second ends of the antenna, wherein the heating element is electrically separate from the antenna, placing an integrated circuit (IC) device on the adhesive such that the first end of the antenna is electrically coupled to the second end of the antenna via the IC device, and applying a trigger to the heating element to cause the heating element to become heated, which causes the adhesive to cure.

In another embodiment, the trigger is applied to the heating element from a single direction.

In another embodiment, the heating element is coplanar with the antenna such that heat from the heating element is delivered from under the IC device.

In another embodiment, the trigger is applied by applying electrical current to the heating element.

In another embodiment, the trigger is applied by applying a laser beam to the heating element.

In another embodiment, the trigger is applied by applying infrared light to the heating element.

In another embodiment, the trigger is applied by applying a heat thermode to the heating element.

In another embodiment, the trigger is applied by applying microwaves to the heating element.

In another embodiment, the trigger is applied to heating pads that also serve as alignment pads.

In another embodiment, the heating element includes two trigger portions and electrical current is applied to the heating element by applying an electrode to each trigger portion to apply a voltage across the heating element.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
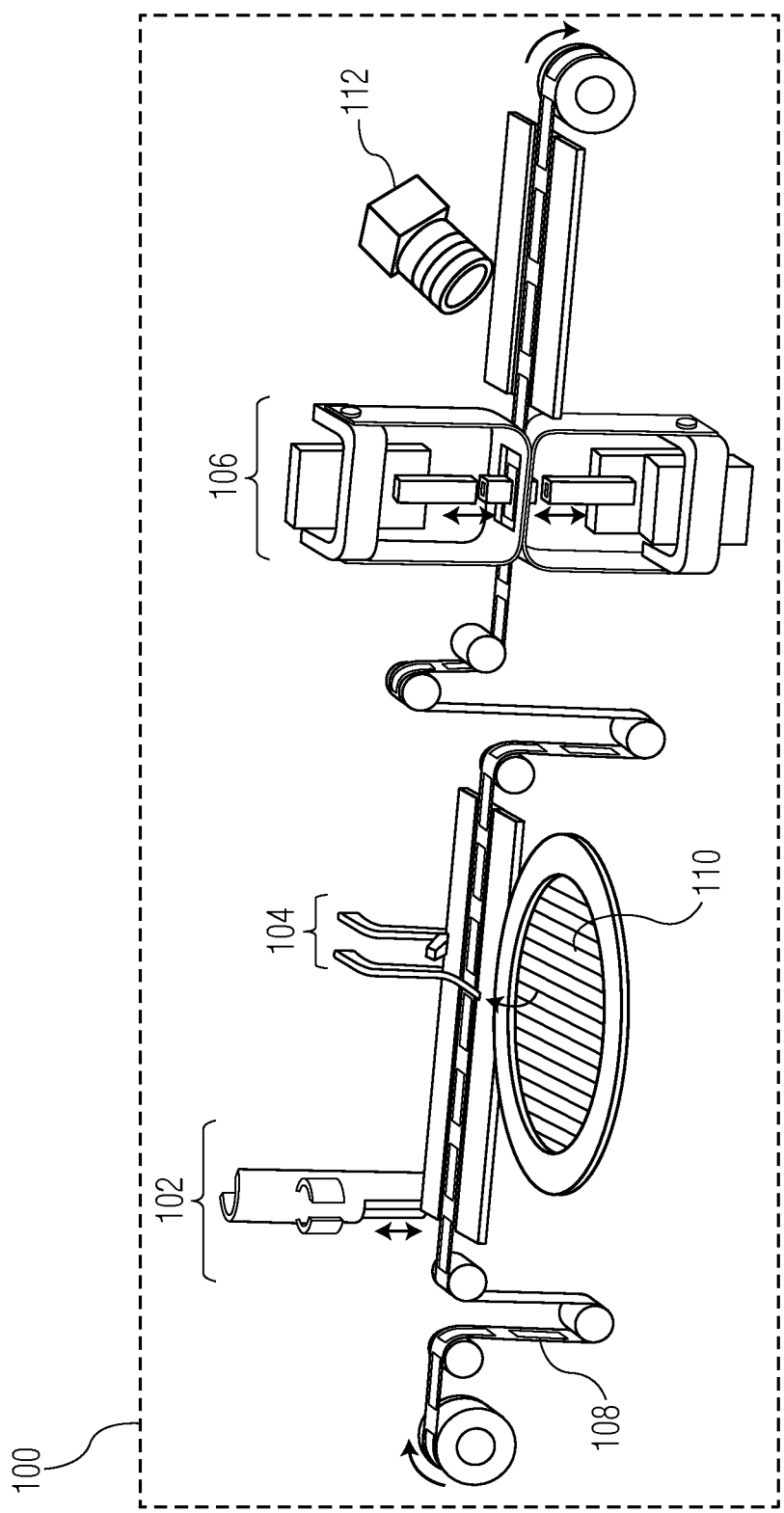
FIG. 1 depicts an assembly system that includes an adhesive subsystem, a chip placement subsystem, and a curing subsystem.

FIG. 1 depicts an assembly system 100 that includes an adhesive subsystem 102, a die placement subsystem 104, and a curing subsystem 106. In an embodiment, the assembly system serially processes antennas formed on a flexible substrate 108. In an embodiment, the flexible substrate on which the antennas are formed is fed into the assembly system and the adhesive subsystem deposits adhesive on the substrate and/or on an antenna on the substrate. Once the adhesive is deposited, the die placement system picks an integrated circuit (IC) device off of a wafer 110 and places the IC device on the adhesive to electrically connect a first end of an antenna to a second end of the antenna via the IC device. After the IC device has been placed, the curing subsystem delivers heat to the adhesive to cure the adhesive and secure the IC device to the antenna. In an embodiment, a camera 112 (or multiple cameras) is used to insure proper alignment during the operations performed by each subsystem. Because the assembly process is serial, the operation of each subsystem affects the timing of other subsystems in the process. Accordingly, if one subsystem takes longer than the other subsystems in the process, the other subsystems in the process are delayed and the assembly time for each device is similarly delayed. Thus, the subsystem that takes the longest to perform its function can become a bottleneck in the assembly process. In an embodiment, the curing subsystem is often times the bottleneck in the process.

Figure 2:
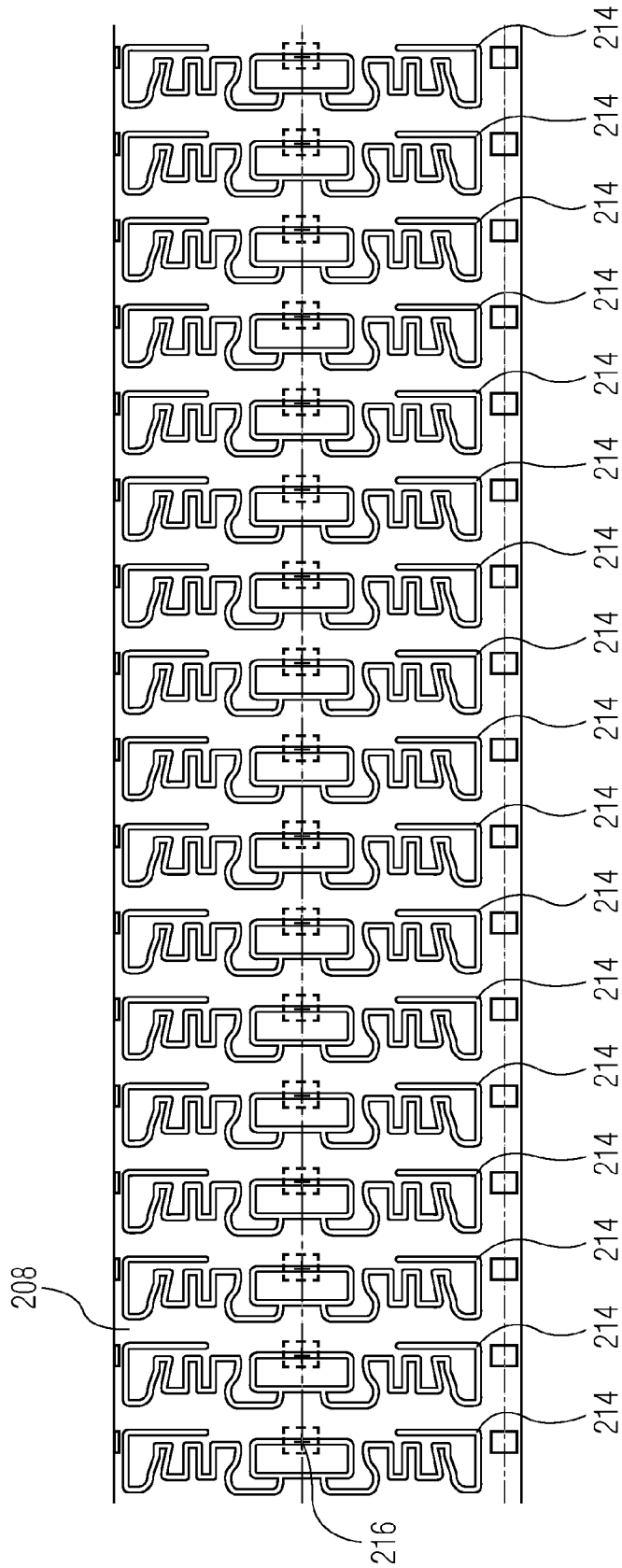
FIG. 2 depicts a section of a flexible substrate that includes antennas for RFID devices that can be assembled using the assembly system of FIG. 1.

FIG. 2 depicts a section of a flexible substrate 208 that includes antennas 214 for RFID devices that can be assembled using the assembly system of FIG. 1. In an embodiment, the flexible substrate is polyethylene terephthalate (PET), polyethylenenaphthalate (PEN), polyimide (PI), paper, foil or some other flexible substrate, having a first major surface on which antennas are formed and a second major surface opposite to the first major surface. In an embodiment, the antennas are formed on the first major surface using a highly conductive material such as aluminum or copper. The antennas are formed with a separation between a first end and a second end of each antenna. In an embodiment, the separation is located such that an RFID IC device can be attached to the antenna spanning the separation and contacting both ends of the antenna. With reference to FIG. 1, the separation between the first and second ends of an antenna is within the area identified by dotted box 216. In an embodiment, the antenna is formed using aluminum with a 9 μm thickness and a 100 μm width (±50 μm) and the first end and the second end of the antenna are separated by a 100 μm wide separation (±20 μm). In an embodiment, an RFID IC device measures 490 μm by 445 μm and has at least two electrically conductive leads that can be electrically connected to the respective ends of the antenna. In other embodiments, the dimensions of the RFID IC device can vary to a smaller or larger size depending on the memory on the device, other features on the device, and the CMOS process. As is known in the field, after the assembly process, the antennas are typically separated from each other and incorporated into other RFID devices.

Figure 3:
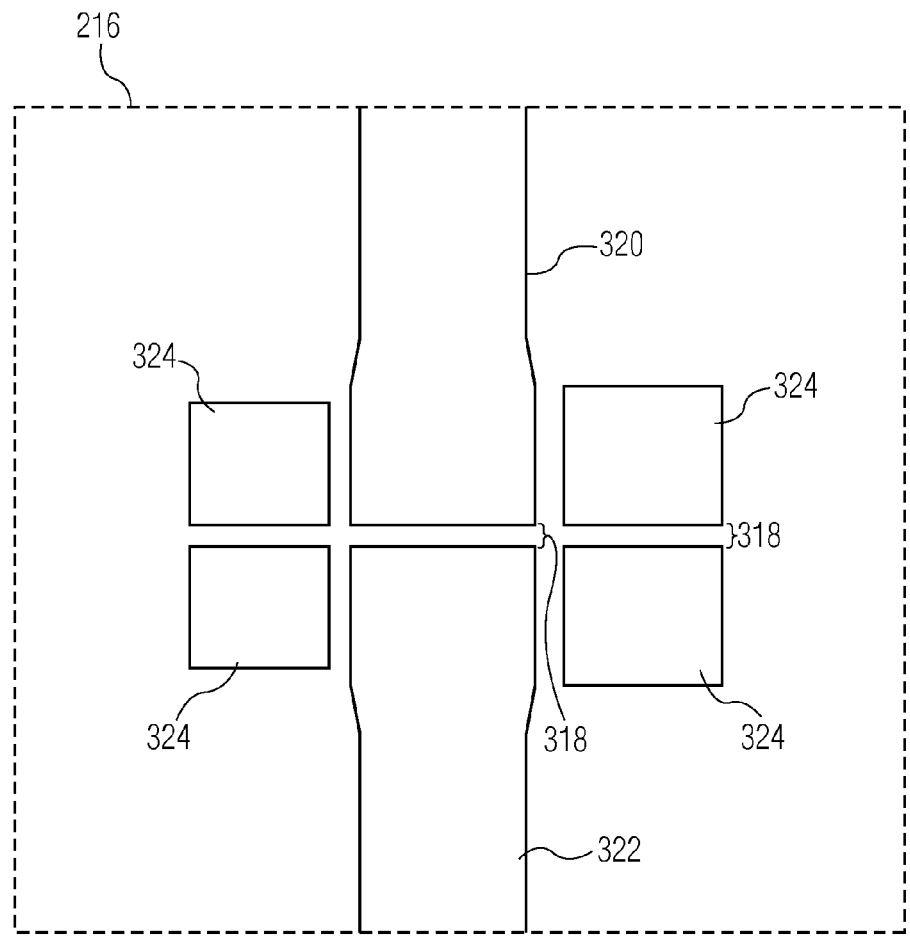
FIG. 3 depicts an expanded view of a portion of an antenna from FIG. 2.

FIG. 3 depicts an expanded view of the portion 216 of the antenna 214 from FIG. 2. Typically, as shown in FIG. 3, the antenna has a first end 320 and a second end 322 that are aligned with each other, but divided by a separation 318 between the first end and the second end. In an embodiment, the separation electrically isolates the first end from the second end. In the embodiment of FIG. 3, the ends of the antenna broaden slightly at the separation. In an embodiment, alignment pads (not shown in FIG. 2) are positioned parallel to and on each side of the first end and the second end of the antenna. The alignment pads are separated by the same distance as the first end and the second end of the antenna. In an embodiment, the alignment pads are formed from the same material as the antenna and are used by the assembly system to align the antenna within each subsystem. In an embodiment, the die placement system has an alignment tolerance of +/−30 μm, but can vary depending on the speed of the system (e.g., slower system can have a lower tolerance) or the precision of manufacture (e.g., laser cut antennas). For example, in the die placement subsystem, the alignment pads are used to optically align the antenna with the die placement subsystem such that an IC device can be accurately placed over the separation to electrically couple the first end of the antenna to the second end of the antenna via the IC device. In another example, in the adhesive subsystem, the alignment pads are used to align the antenna such that the adhesive is accurately deposited.

Figure 4:
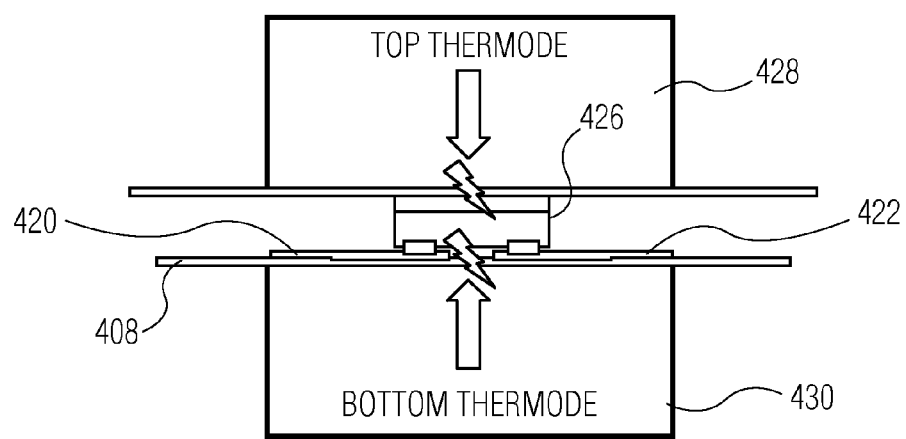
FIG. 4 illustrates a typical technique for curing adhesive.

As described above, the assembly system includes a subsystem for curing adhesive. FIG. 4 illustrates a typical technique for curing adhesive. In the example of FIG. 4, an IC device 426 is placed such that it is touching or otherwise electrically coupled to a first end 420 and a second end 422 of an antenna that is formed on a substrate 408. A top thermode 428 is applied to the top surface of the IC device and a bottom thermode 430 is applied to the underside of the substrate 408. The top thermode applies heat to the IC device, which transfers to the adhesive beneath the IC device. The bottom thermode applies heat to the substrate, which also transfers to the adhesive beneath the IC device. By heating the IC device and the underside of the substrate, heat transfers to the adhesive and causes the adhesive to cure, thereby securing the IC device in place. While the technique illustrated in FIG. 4 does cure the adhesive, the technique relies on the heating of components that do not necessarily need to be heated (e.g., heating the IC device and the substrate). Heating such elements takes time and, therefore, curing the adhesive is often a bottleneck in the assembly process and thus, an important factor in determining the throughput of the assembly process.

In accordance with an embodiment of the invention, an antenna structure is disclosed. In the embodiment, the antenna structure includes a substrate and an antenna that is formed on the substrate, the antenna having a first end and a second end that are separated. The antenna structure also includes a heating element formed on the substrate with at least a portion of the heating element being located in the separation between the first and second ends of the antenna, with the heating element being electrically separate from the antenna. In an embodiment, the heating element is formed from the same material as the antenna and is co-planar to the antenna, but is electrically separate from the antenna. Using the above-described antenna structure in an assembly process allows heat to be applied directly to the adhesive, which reduces the curing time and thus increases throughput. In an example operation, a trigger is applied to the heating element to generate heat and the portion of the heating element located in the separation between the first and second ends of the antenna serves as a conduit for delivering heat to the adhesive underneath an IC device (once placed). Delivering heat directly to the adhesive reduces the time needed to cure the adhesive because time is not spent heating other components, such as the IC device or the substrate before heat is delivered to the adhesive. Thus, the entire assembly process can be expedited.

Figure 5:
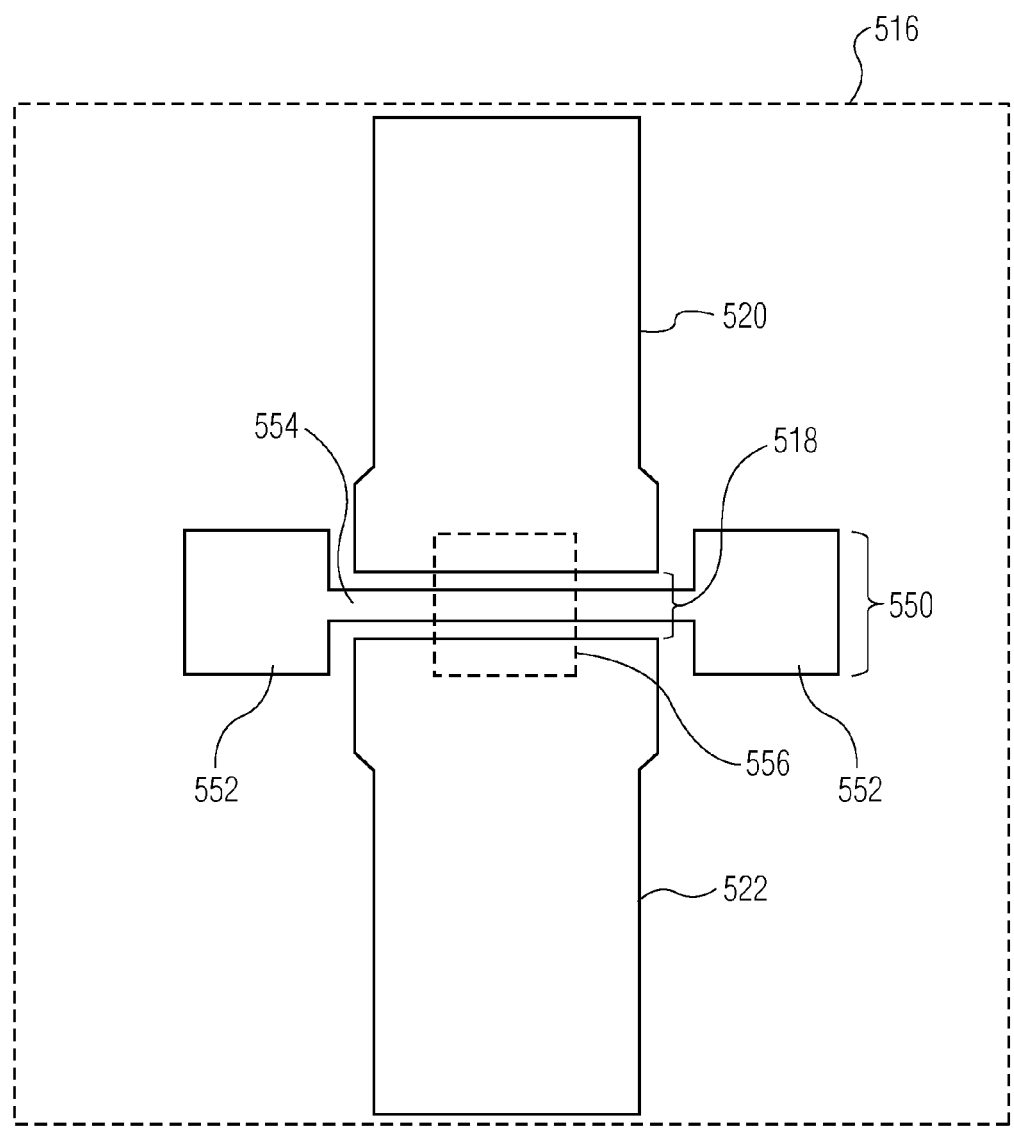
FIG. 5 depicts a portion of an antenna structure that includes a heating element in accordance with an embodiment of the invention.

FIG. 5 depicts a portion of an antenna structure 516 (from a location similar to the portion of antenna 216 in FIG. 2) that includes a heating element 550 in accordance with an embodiment of the invention. The antenna structure includes a first end 520 and a second end 522 of an antenna that are separated and a heating element that includes a trigger portion 552 and a heating portion 554. In an embodiment, the heating element and the antenna are formed using the same mask, are formed from the same material (e.g., silver, copper, aluminum, etc.), and are formed co-planar on the same substrate. In an embodiment, an integrated circuit (IC) device is placed such that the IC device has a footprint (indicated by the dotted box 556) that spans the separation 518 between the first end and the second end of the antenna. In the embodiment of FIG. 5, the trigger portion of the heating element includes two trigger pads that are external to the footprint of the IC device and external to the separation between the first end and the second end of the antenna. For example, as shown in FIG. 5, the two trigger pads are separated from each other by a distance that is wider than the width of the antenna. The heating portion of the heating element is, at least, partially located in the separation between the first end and the second end of the antenna and within the footprint of the IC device. In an embodiment, the heating portion of the heating element runs parallel to the edges of the antenna (e.g., the edges formed by the first end and the second end) and under the IC device. In the embodiment of FIG. 5, the two trigger pads are located on opposite sides of the footprint of the IC device and each trigger portion has a width that is larger than the width of the heating portion. In another embodiment, the trigger portion of the heating element includes only one trigger pad and/or the trigger pad is the same width as the heating portion.

Figure 6A:
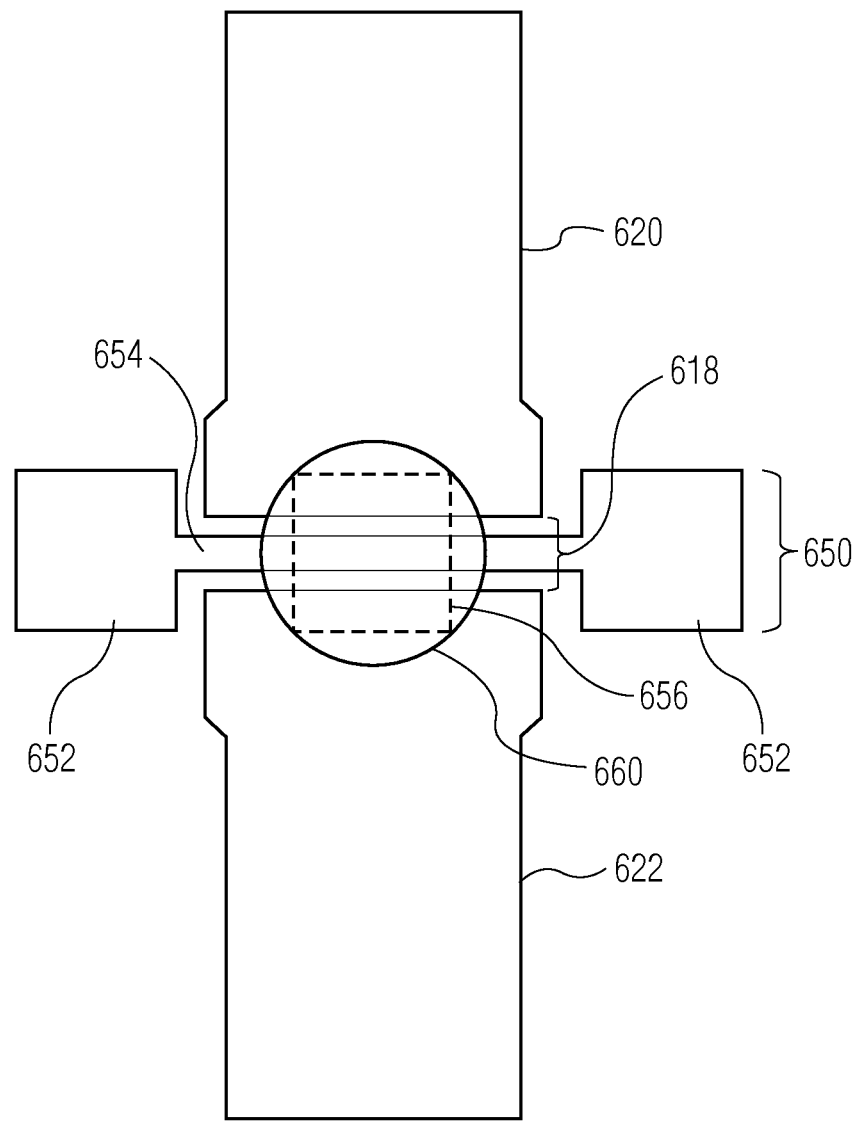
FIGS. 6A through 6C illustrate a technique for attaching an IC device to the antenna structure of FIG. 5 in accordance with an embodiment of the invention.
Figure 6B:
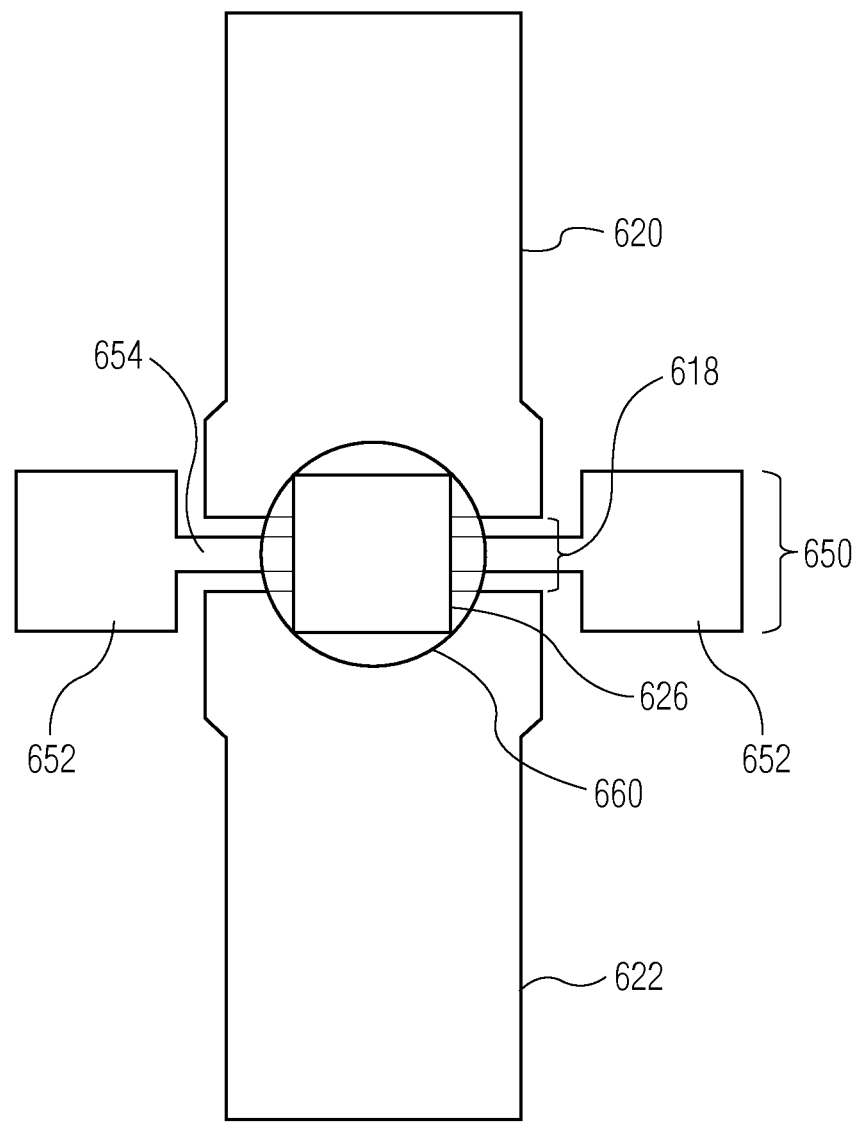
Figure 6C:
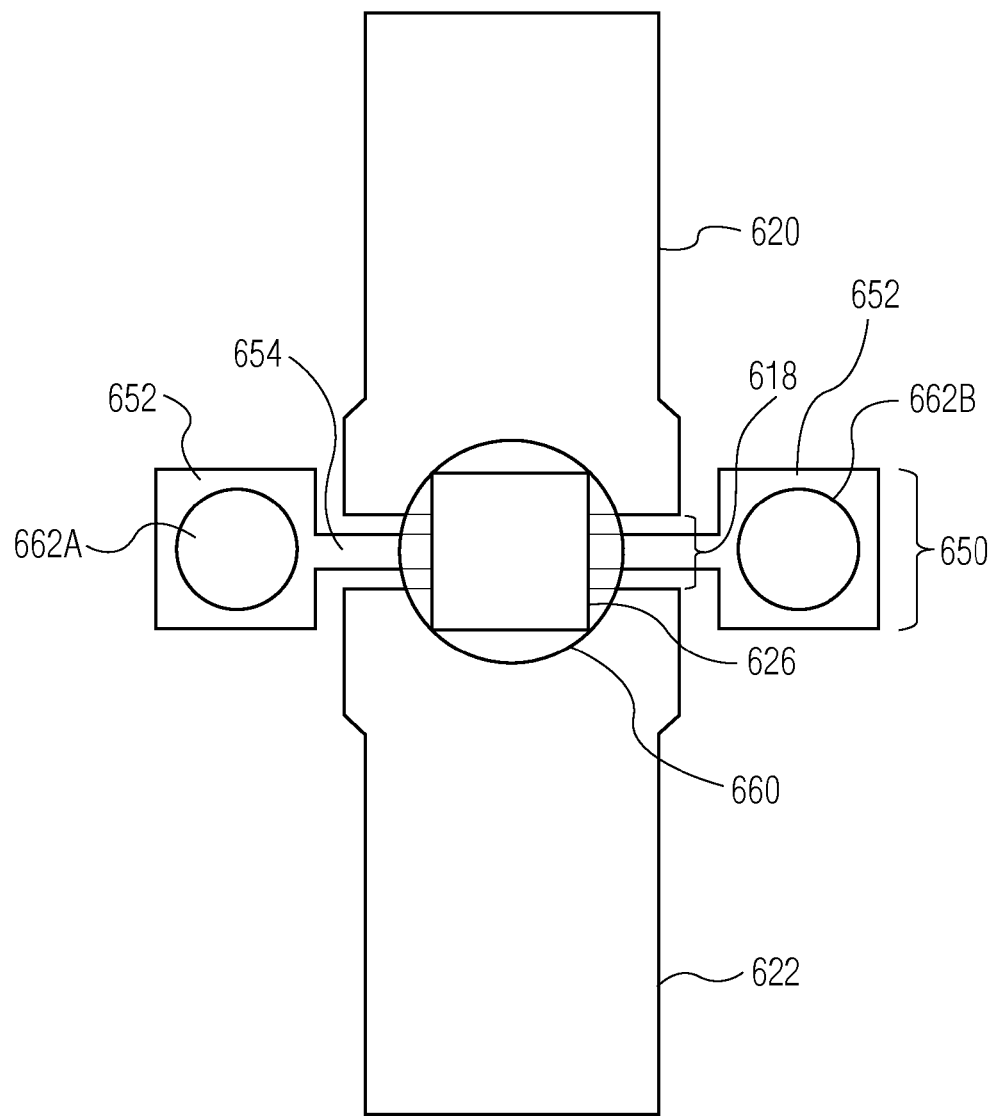

FIGS. 6A through 6C illustrate a technique for attaching an IC device to the antenna structure of FIG. 5 in accordance with an embodiment of the invention. As illustrated in FIG. 6A, an adhesive 660 is deposited on the antenna structure. In an embodiment, the adhesive is an acrylic glue (e.g., Delo AC365 or Delo AC265), but other adhesives can be used as well. In the embodiment of FIG. 6A, the adhesive is deposited on the antenna structure centered on where the IC device will be placed (as indicated by the footprint 656). In an embodiment, the adhesive is applied by an adhesive subsystem of an assembly system such as the adhesive subsystem 102 of the assembly system 100 as illustrated in FIG. 1. As illustrated in FIG. 6B, an IC device 626 is placed on the adhesive 660 such that the IC device spans the separation 618 between the two ends of the antenna 620, 622. In an embodiment the IC device is placed on the adhesive by a die placement subsystem 104 of the assembly system as illustrated in FIG. 1. In an embodiment, the heating portion 654 of the heating element 650 runs at least partly under the adhesive and partly within the footprint of the IC device.

After the IC device is placed, a trigger is applied to the trigger portion 652 (e.g., the two trigger pads) of the heating element 650 as illustrated in FIG. 6C by circles 662A and 662B. In an embodiment, the trigger can be applied from a single direction (e.g., top down or bottom up). For example, the trigger can be electricity applied by electrodes placed on the top side of the trigger portion (e.g., an electrode on the top of each of the two trigger pads) to apply a voltage across the heating element. In an embodiment, the trigger can be applied to a single trigger pad. For example, if the trigger is a laser beam, then the laser beam can be incident on a single trigger pad (e.g., just circle 662A). In an embodiment, the trigger can be applied by a curing subsystem configured in accordance with an embodiment of the invention that can replace a curing subsystem 106 in the assembly system 100 as illustrated in FIG. 1.

Once the trigger is applied to the trigger portion of the heating element, the heating portion of the heating element begins to heat up and delivers heat to the adhesive. At least a portion of the heating portion is located directly under the adhesive and within the footprint of the IC device. Because of the location of the heating portion, heat is delivered directly to the adhesive, which allows for quicker curing with less heat than is needed by curing techniques such as the technique described with reference to FIG. 4. Accordingly, the entire assembly process can be expedited.

In other embodiments, the trigger can be a laser beam applied to the trigger portion of the heating element, infrared light applied to the trigger portion of the heating element, a heat thermode applied to the trigger portion of the heating element, and/or microwaves applied to the trigger portion of the heating element. In other embodiments, other triggers are also possible.

Figure 7:
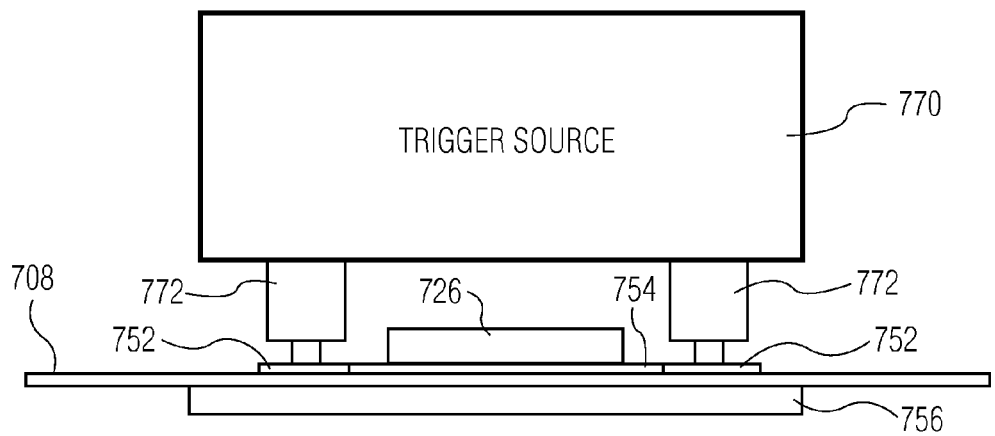
FIG. 7 is a side view of the application of a trigger.

FIG. 7 is a side view of the application of a trigger. FIG. 7 illustrates an antenna structure on a guidance platform 756, an IC device 726 placed on the antenna structure, and a trigger source 770 with two application heads 772 that apply the trigger to trigger portions 752 of a heating element 754 of the antenna structure. The antenna structure includes an antenna (not shown) formed on a substrate 708. In an embodiment, the IC device 726 is physically separated from the trigger source such that the trigger is delivered to the heating element via the two application heads before other elements of the antenna structure are heated. A second trigger source (e.g., below the antenna structure) is not needed because sufficient heat can be generated by the heating portion of the heating element when the trigger is applied by the single trigger source. Accordingly, the number of trigger sources needed in an assembly system can be reduced as compared to traditional assembly systems. In an embodiment, if the trigger is applied by applying a voltage across the heating element, then the application heads include electrodes. One electrode serves as a positive electrode and one electrode serves as a negative electrode such that, upon the application of the voltage across the heating element, current is conducted from the positive electrode, across the heating element, and to the negative electrode. The current causes the heating portion of the heating element to heat up without having to first heat the IC device or the substrate beneath the heating element. The heating element delivers heat directly to the location of the adhesive and cures the adhesive on which the IC device is placed. In an embodiment, during the curing process, the application heads apply the trigger via direct contact with the pads of the trigger portion of the heating element, but, in other embodiments, the application heads can apply the trigger without direct contact (e.g., application of a laser beam to the pads of the trigger portion).

Figure 8:
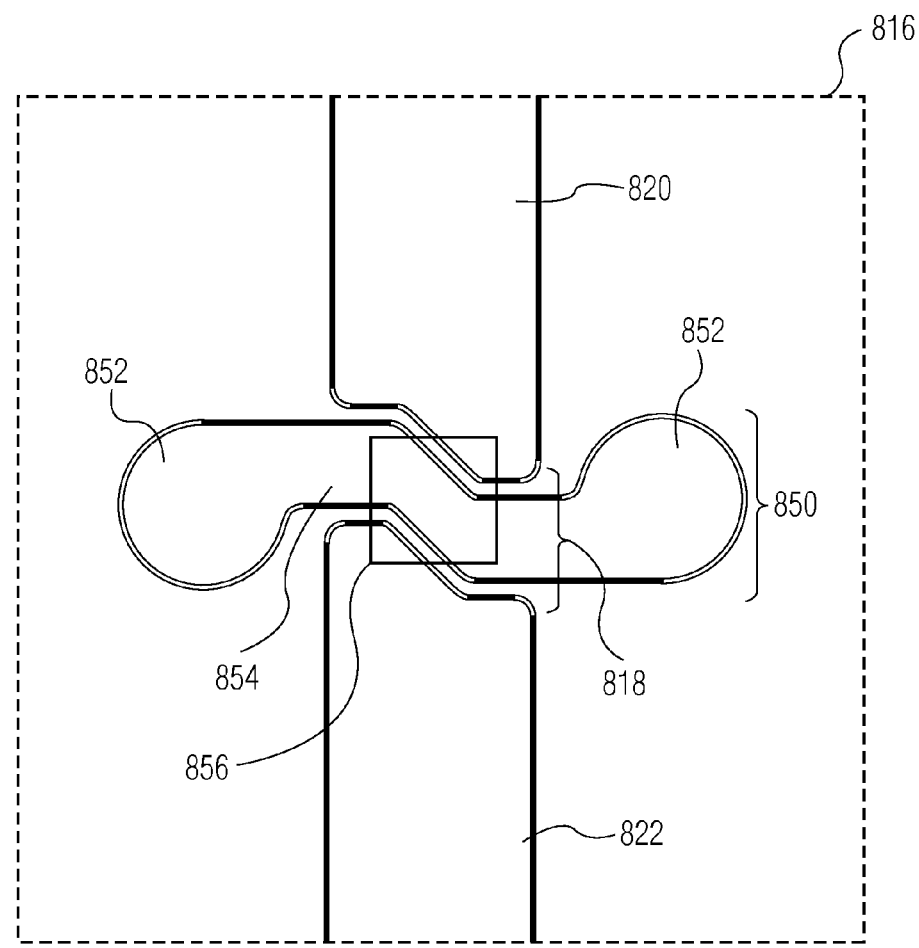
FIG. 8 depicts an embodiment of a heating element with a portion of the heating element running diagonally relative to the footprint of an IC device.

FIG. 8 depicts an embodiment of a heating element 850 with a portion of the heating element 854 running diagonally relative to the footprint 856 of an IC device. In an embodiment, the heating element runs diagonally when the heating element forms a sloping line between two non-consecutive corners of the separation between the first end and the second end of an antenna. In FIG. 8, a first end 820 and a second end 822 of an antenna are shown. As indicated by the footprint 856, an IC device, once placed, would span the separation 818 between the first and second ends of the antenna and the heating portion 854 of the heating element would run through the separation. In an embodiment, the first and second ends form matching angles (e.g., angles with opposite measures such that the ends would meet without gaps or overlap) and the heating portion is configured to run from the top left to the bottom right (with reference to the frame of FIG. 8) such that the heating portion runs diagonally under the IC device. The diagonal configuration allows for a large surface area of the heating element to be within the footprint of the IC device, which can allow more heat to be delivered to the adhesive than when using a horizontal configuration.

Figure 9:
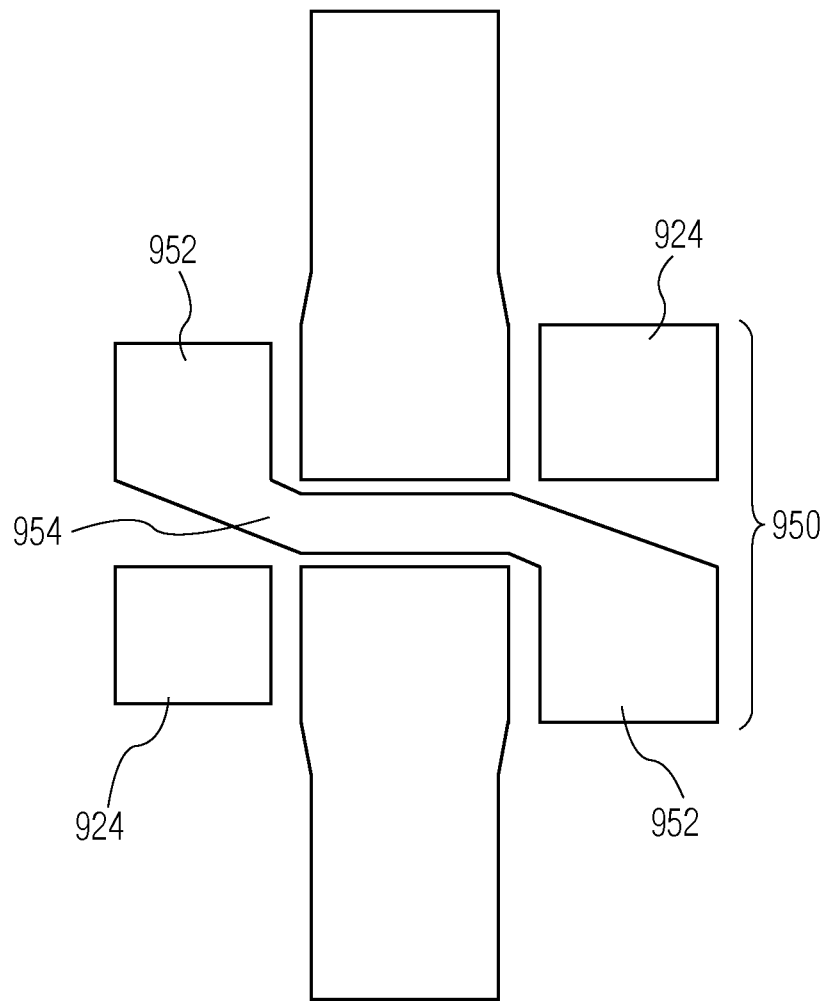
FIG. 9 depicts a configuration of the antenna structure in which the trigger portions of the heating element also serve as alignment pads.

FIG. 9 depicts a configuration of the antenna structure in which the trigger portions 952 of the heating element 950 also serve as alignment pads. Similar to FIG. 3, the antenna structure may include alignment pads 924. However, in addition to assisting with positioning the antenna structure within the assembly system, some of the alignment pads can be configured as part of the trigger portion, which is connected to the heating portion 954 of the heating element. As shown in FIG. 9, the top left alignment pad and the bottom right alignment pad (relative to the orientation of FIG. 9) are part of the trigger portions of the heating element and separate space on the substrate for the alignment pad and the heating element is not used as would be the case in, for example, FIG. 5 above if alignment pads and the heating element were used. Thus, extra space needed for the heating element on the substrate (e.g., space used by the heating element) can be reduced because space allocated to alignment pads can serve a dual purpose (e.g., as trigger portions of the heating element and as alignment pad).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In an embodiment, electrically separate means that there is no conductive path between two elements (e.g., between the heating element and the antenna) across a non-conductive substrate.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An antenna structure, the antenna structure comprising:
    a substrate;
    an antenna formed on the substrate, the antenna having a first end and a second end that are separated; and
    a heating element formed on the substrate with at least a portion of the heating element being located in the separation between the first and second ends of the antenna;
    wherein the heating element is electrically separate from the antenna; and
    wherein the heating element comprises alignment pads.

2. The antenna structure of claim 1, wherein the heating element runs perpendicular to edges of the first end and the second end of the antenna.

3. The antenna structure of claim 1, wherein the heating element comprises:
    at least one trigger portion; and
    a heating portion;
    wherein an integrated circuit (IC) device spans the separation; and
    wherein the trigger portion is external to a footprint of the IC device and the heating portion is, at least, partially located in the separation between the first end and the second end of the antenna.

4. The antenna structure of claim 3, wherein the width of the at least one trigger portion is larger than the width of the heating portion.

5. The antenna structure of claim 3, wherein the trigger portion comprises two pads on opposite sides of the IC device.

6. The antenna structure of claim 3, wherein the heating portion is partially located within the separation between the first end and the second end of the antenna and within the footprint of the IC device.

7. The antenna structure of claim 1, wherein the heating element is formed from the same material as the antenna.

8. The antenna structure of claim 1 further comprising an IC device coupled to the first end and the second end of the antenna such that at least a portion of the heating element runs under the IC device parallel to edges of the first end and the second end.

9. The antenna structure of claim 1, wherein the heating element is co-planar with the antenna.

10. A method for assembling an RFID device, the method comprising:
- placing an adhesive on an antenna structure of an RFID device, the antenna structure including:
  - a substrate;
  - an antenna formed on the substrate, the antenna having a first end and a second end that are separated; and
  - a heating element formed on the substrate with at least a portion of the heating element being located in the separation between the first and second ends of the antenna;
  - wherein the heating element is electrically separate from the antenna;
- placing an integrated circuit (IC) device on the adhesive such that the first end of the antenna is electrically coupled to the second end of the antenna via the IC device; and
- applying a trigger to the heating element to cause the heating element to become heated, which causes the adhesive to cure.

11. The method of claim 10, wherein the trigger is applied from a single direction.

12. The method of claim 10, wherein the heating element is coplanar with the antenna such that heat from the heating element is delivered from under the IC device.

13. The method of claim 10, wherein applying the trigger comprises applying electrical current to the heating element.

14. The method of claim 10, wherein applying the trigger comprises applying a laser beam to the heating element.

15. The method of claim 10, wherein applying the trigger comprises applying infrared light to the heating element.

16. The method of claim 10, wherein applying the trigger comprises applying a heat thermode to the heating element.

17. The method of claim 10, wherein applying the trigger comprises applying microwaves to the heating element.

18. The method of claim 10, wherein the trigger is applied to heating pads that also serve as alignment pads.

19. The method of claim 13, wherein the heating element is comprised of two trigger portions and applying electrical current to the heating element comprises applying an electrode to each trigger portion to apply a voltage across the heating element.

* * * * *